United States Patent
Cagdaser et al.

(10) Patent No.: US 9,285,207 B2
(45) Date of Patent: Mar. 15, 2016

(54) LINEAR CAPACITIVE DISPLACEMENT SENSOR

(71) Applicant: InvenSense, Inc., Sunnyvale, CA (US)

(72) Inventors: Baris Cagdaser, Sunnyvale, CA (US); Du Chen, San Jose, CA (US); Hasan Akyol, Mountain View, CA (US); Derek Shaeffer, Redwood City, CA (US)

(73) Assignee: INVENSENSE, INC., San Jose, CA (US)

( * ) Notice: Subject to any disclaimer, the term of this patent is extended or adjusted under 35 U.S.C. 154(b) by 270 days.

(21) Appl. No.: 13/952,281

(22) Filed: Jul. 26, 2013

(65) Prior Publication Data

US 2014/0266256 A1 Sep. 18, 2014

Related U.S. Application Data

(60) Provisional application No. 61/780,437, filed on Mar. 13, 2013.

(51) Int. Cl.
  *G01B 7/14* (2006.01)
  *G01D 5/241* (2006.01)
  *G01D 5/24* (2006.01)

(52) U.S. Cl.
  CPC .. *G01B 7/14* (2013.01); *G01D 5/24* (2013.01); *G01D 5/2412* (2013.01)

(58) Field of Classification Search
  CPC .............................. G01R 27/2605; G01B 7/14
  USPC .......................................................... 324/679
  See application file for complete search history.

(56) References Cited

U.S. PATENT DOCUMENTS

| | | | |
|---|---|---|---|
| 4,167,697 A * | 9/1979 | Gerber | 324/661 |
| 5,006,952 A | 4/1991 | Thomas | |
| 5,028,876 A | 7/1991 | Cadwell | |
| 5,065,105 A | 11/1991 | Bruere et al. | |
| 5,550,516 A * | 8/1996 | Burns et al. | 331/65 |
| 2011/0261006 A1 | 10/2011 | Joharapurkar et al. | |
| 2013/0067984 A1* | 3/2013 | Balachandran et al. | 73/1.38 |
| 2014/0266263 A1* | 9/2014 | Wurzinger et al. | 324/686 |

OTHER PUBLICATIONS

The International Search Report and the Written Opinion of the International Searching Authority for International Application No. PCT/US2014/019680, mailed on Jan. 2, 2015.

* cited by examiner

*Primary Examiner* — Jeff Natalini
(74) *Attorney, Agent, or Firm* — Sawyer Law Group, P.C.

(57) ABSTRACT

A method and system for measuring displacement of a structure is disclosed. The method and system comprise providing a first capacitance and providing a second capacitance. The first and second capacitances share a common terminal. The method and system further include determining a difference of the inverses of the value of the first and second capacitances when the structure is displaced. The first capacitance varies in inverse relation to the displacement of the structure.

11 Claims, 16 Drawing Sheets

LINEAR CAPACITIVE DISPLACEMENT SENSOR

CROSS-REFERENCE TO RELATED APPLICATION

This application claims benefit under 35 USC 119(e) of U.S. Provisional Patent Application No. 61/780,437, filed on Mar. 13, 2013, entitled "LINEAR CAPACITIVE DISPLACEMENT SENSOR," which is incorporated herein by reference in its entirety.

FIELD OF THE INVENTION

The present invention relates generally to displacement measurement by a sensor and more particularly to capacitive displacement sensing.

BACKGROUND

Displacement sensors are utilized in a variety of environments. For example, they are utilized in automotive applications, motion sensing applications, aeronautical applications and the like. It is desirable to provide accurate and low cost displacement sensors for many of these applications. The present invention addresses such a need.

SUMMARY

A method and system for measuring displacement of a structure is disclosed. The method and system comprise providing a first capacitance and providing a second capacitance. The first and second capacitances share a common terminal. The method and system further include determining a difference of the inverses of the value of the first and second capacitances when the structure is displaced. The first capacitance varies in inverse relation to the displacement of the structure.

DETAILED DESCRIPTION

The present invention relates generally to displacement measurement by a sensor and more particularly to capacitive displacement sensing. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1A:
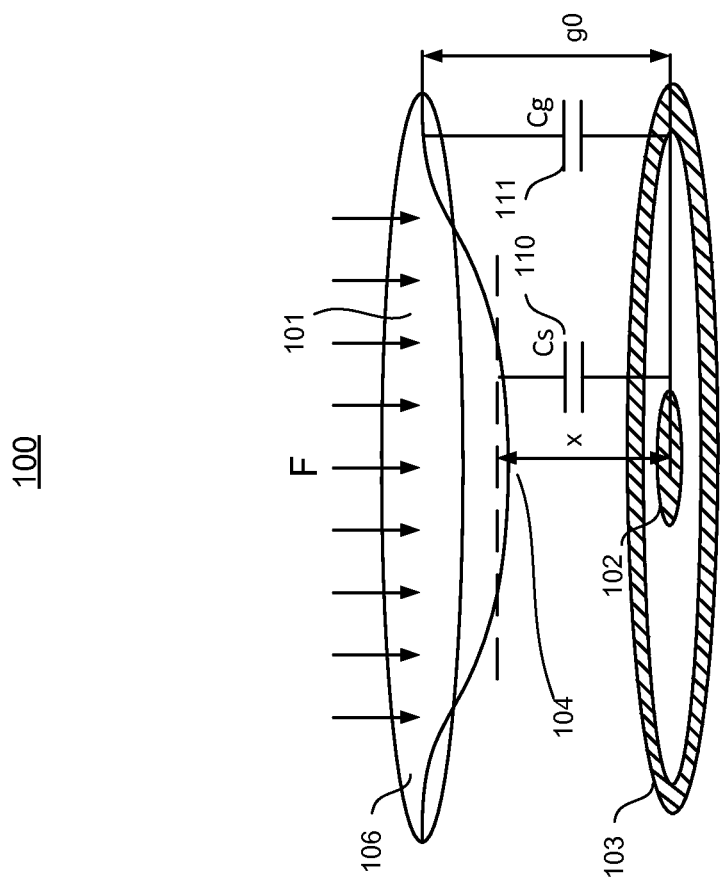
FIG. 1a shows a diagram of capacitive sensor sharing one diaphragm.

As shown in FIG. 1a, physical structures of capacitive sensor 100 comprise one (or more) diaphragm 101 and a set of fixed electrodes 102 and 103. Force F applied to one (or both) side(s) of the diaphragm will cause it to deflect until the elastic force balances the force. One sense electrode 102 is located underneath the diaphragm and where the diaphragm 101 deforms at 104 and one gap electrode 103 is located where diaphragm 101 is rigidly clamped at 106. The overlap of diaphragm 101 and fixed electrodes 102 and 103 forms two capacitances: a sense capacitance $C_s$ 110 and gap capacitance $C_g$ 111.

Figure 1B:
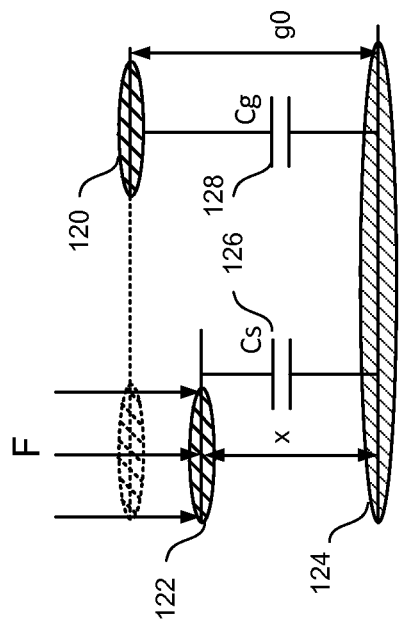
FIG. 1b shows a diagram of capacitive sensor sharing one fixed electrode.

In a second embodiment as shown in FIG. 1b, physical structures of capacitive sensor 100' could also comprise one (or more) moving electrode 122 and a set of fixed electrodes 120 and 124. Force F applied to the moving electrode 122 will change the displacement with respect to the fixed electrode 124. Moving electrode 122 and fixed electrode 124 form a sense capacitance $C_s$ 126. The fixed electrode 120 and the fixed electrode 124 form a gap capacitance $C_g$ 128.

The force F can be related to various mechanical or physical properties. Pressure and acceleration are two examples of known capacitive sensor applications.

The displacements of sensors 100 and 100' shown in FIG. 1a and FIG. 1b can be described by the equation:

$$x = g_0 - f(F) \tag{1}$$

where $g_0$ is initial displacement, F is applied force and the separation of the electrode is a linear or affine function of applied force f(F) and x is the effective displacement with the appearance of force F.

Assume the parallel plate model can be employed and ignoring fringing field, the sense capacitance $C_s$ and gap capacitance $C_g$ are given by the following equation:

$$C_s = \frac{\varepsilon_0 \varepsilon_r A}{x} \tag{2}$$

$$C_g = \frac{\varepsilon_0 \varepsilon_r A}{g_0} \tag{3}$$

Where $\varepsilon_0$ the permittivity of free space is, $\varepsilon_r$ is the relative permittivity of the material between electrodes or between electrodes and diaphragm, A is the area of overlap between electrodes or area of overlap between electrode and diaphragm and x is the displacement. From the above equations it is seen that the capacitance varies in a non-linear manner with respect to the displacement x.

The first order linearization versus force can be achieved by inversion of the capacitance:

$$\frac{1}{C_s} = \frac{g_0 - f(F)}{\varepsilon_0 \varepsilon_r A} \tag{4}$$

A common problem for the capacitance sensing is that the initial gap $g_0$ is susceptible to temperature and stress. To cancel the $g_0$ variation, the difference between the inversion of the gap capacitance and the inversion of the sense capacitance is given by equation (5) below:

$$\frac{1}{C_g} - \frac{1}{C_s} = \frac{f(F)}{\varepsilon_0 \varepsilon_r A} \tag{5}$$

Since $C_s$ and $C_g$ share same terminal, the measurement can be done by multiple phases. As shown in FIG. 2a to FIG. 2d, a single-ended readout circuit with multiple phase operation can generate a output which is proportional to Equation (5)

Figure 2A:
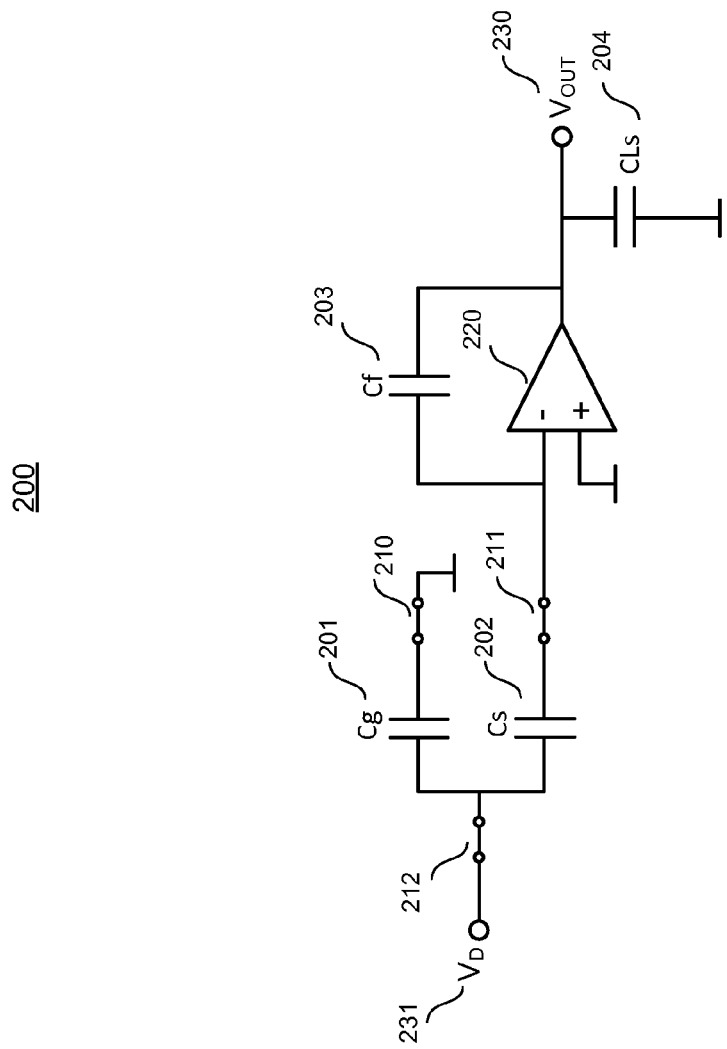
FIG. 2a shows a configuration to measure $C_s$ at a first phase, where an operational amplifier is employed to regulate the voltage at sense electrode and the common terminal of $C_s$ and $C_g$ is driven by a step drive voltage $V_D$.

FIG. 2a shows a configuration to measure $C_s$ 202 at the first phase, where an operational amplifier 220 is employed to regulate the voltage at the sense electrode. A common terminal of $C_s$ 202 and $C_g$ 201 is driven by a positive step voltage $V_D$ 231. Since $C_g$ 201 is disconnected from the input of the operational amplifier 220 during this phase, only net charge across $C_s$ 202 transfers to a feedback capacitance $C_f$ 203. The output voltage $V_{OUT}$ 230 which is sampled by load capacitance $C_{Ls}$ 204 at the end of the first phase operation is given by the equation:

$$V_{OUT\_ph1} = \frac{-V_D C_s}{C_f} \tag{6}$$

Figure 2B:
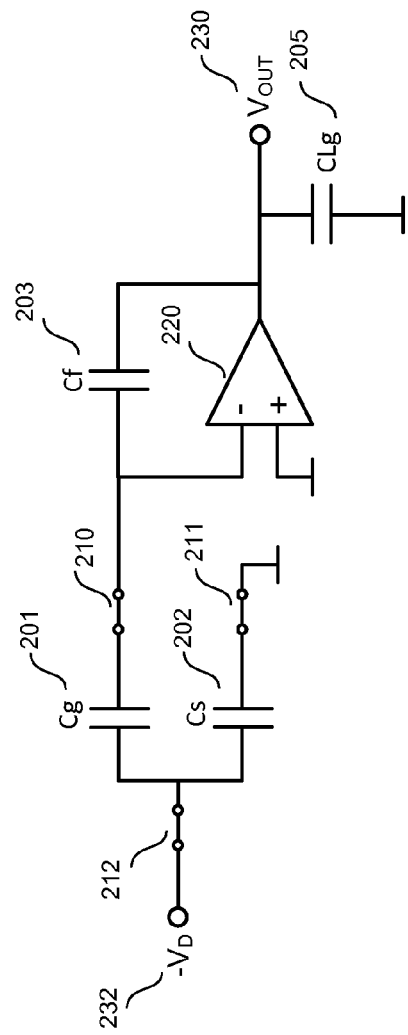
FIG. 2b shows a configuration to measure $C_g$ at a second phase, where an operational amplifier is employed to regulate the voltage at gap electrode and the common terminal of $C_s$ and $C_g$ is driven by a step drive voltage $-V_D$.

FIG. 2b shows a configuration to measure $C_g$ 201 at the second phase, where the common terminal of $C_s$ 202 and $C_g$ 201 is driven by a negative step voltage $-V_D$ 232. Since $C_s$ 202 is disconnected from an input of the operational amplifier 220, only the net charge across $C_g$ 201 transfers to a feedback capacitance $C_f$ 203. The output voltage $V_{OUT}$ 230 which is sampled by load capacitance $C_{Lg}$ 205 at the end of the second phase operation is given by the equation:

$$V_{OUT\_ph2} = \frac{V_D C_g}{C_f} \tag{7}$$

Figure 2C:
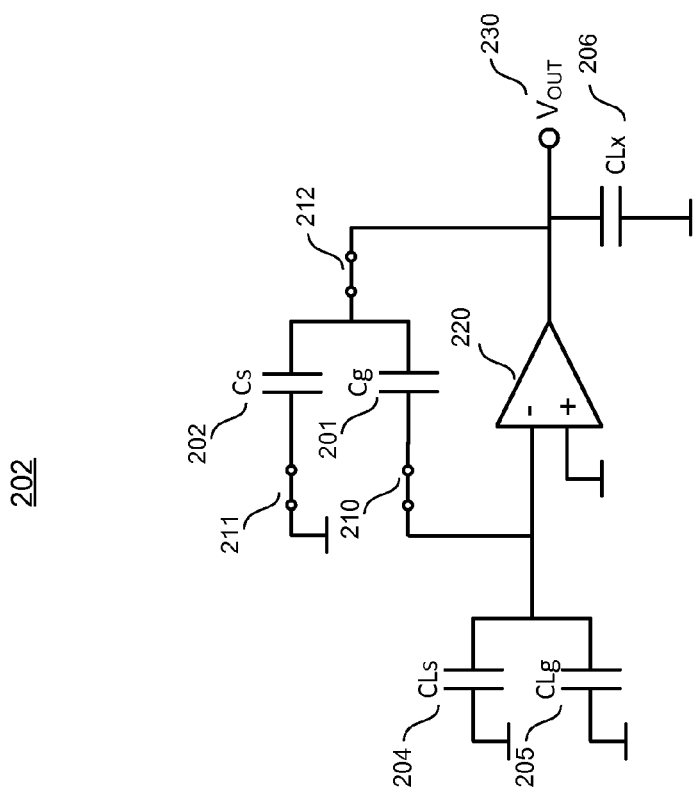
FIG. 2c shows a configuration to linearize the output with respect to $C_g$ at a third phase, where both $C_{Ls}$ and $C_{Lg}$ which sampled the outputs of the first two phases respectively are connected to the negative input of the operational amplifier.

FIG. 2c shows a configuration to linearize the output with respect to $C_g$ 201 at the third phase, where both $C_{Ls}$ 204 and $C_{Lg}$ 205 which sampled first two phases outputs respectively are connected to the negative input of the operational amplifier 220. The charge stored at $C_{Ls}$ 204 and $C_{Lg}$ 205 transfers to the feedback capacitance $C_g$ 201. The output voltage $V_{OUT}$ 230 which is sampled by load capacitance $C_{Lx}$ 206 at the end of the third phase operation is given by the equation:

$$V_{OUT\_ph3} = \frac{V_D(C_{Lg} C_g - C_{Ls} C_s)}{C_f C_g} \tag{8}$$

Figure 2D:
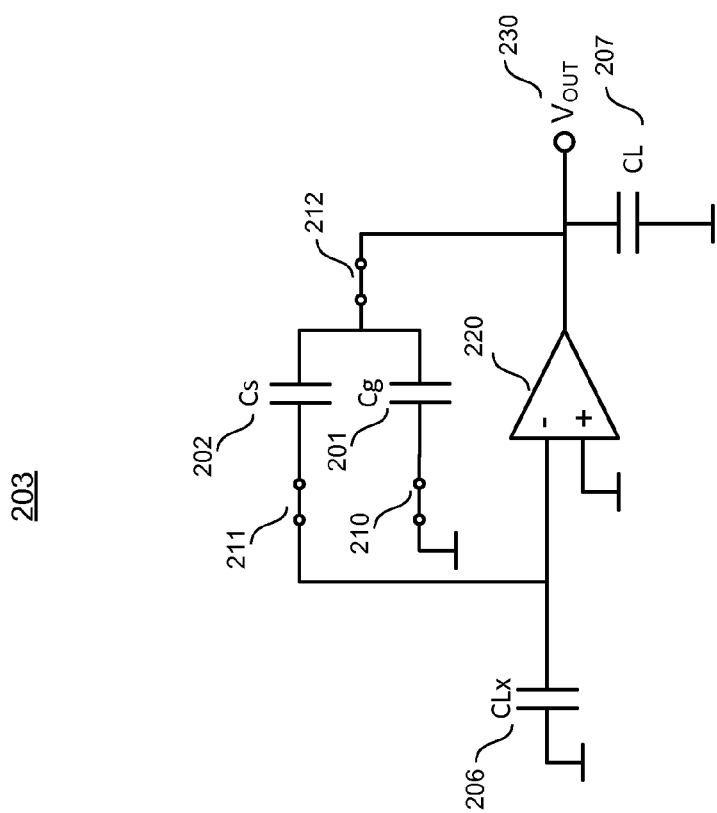
FIG. 2d shows a configuration to linearize the output with respect to $C_s$ at the fourth phase, where the third phase outputs sampled at $C_{Lx}$ is connected to an input of an operational amplifier.

FIG. 2d shows a configuration to linearize the output with respect to $C_s$ 202 at the fourth phase, where the third phase outputs sampled at $C_{Lx}$ 206 are connected to the input of operational amplifier 220. The charge stored at $C_{Lx}$ 206 transfers to a feedback capacitance $C_s$ 202. The output voltage $V_{OUT}$ 230 which is sampled by the load capacitance $C_L$ 207 at the end of the fourth phase operation is given by the equation:

$$V_{OUT\_ph4} = \frac{V_D C_{Lx}(C_{Lg} C_g - C_{Ls} C_s)}{C_f C_g C_s} \tag{9}$$

By setting $C_{Ls}$ 204 equal to $C_{Lg}$ 205, the Equation (9) can be reduced by:

$$V_{OUT\_ph4} = \left(\frac{1}{C_g} - \frac{1}{C_s}\right) \frac{V_D C_{Lx} C_{Lg}}{C_f} \tag{10}$$

From Equation (10), the output of the readout circuitry can deliver the linear function with respect to the displacement and the transducer gain of the readout circuitry is adjusted by setting $V_D$, $C_{Lx}$, $C_{Lg}$ and $C_f$ base on the sensitivity of $C_s$.

Figure 2E:
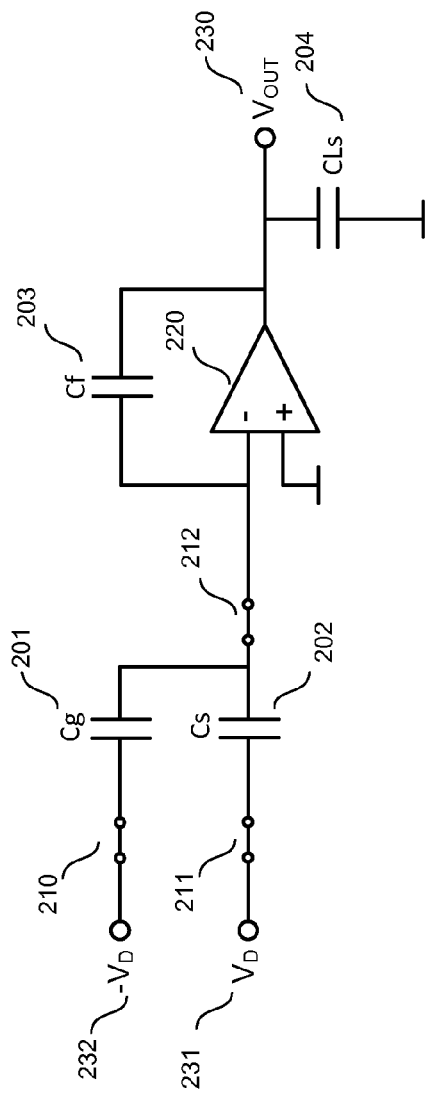
FIG. 2e shows an alternative configuration to measure a difference of $C_s$ and $C_g$ at the first phase by sensing at the common terminal, where an operational amplifier is employed to regulate the common terminal voltage.

FIG. 2e shows an alternative configuration to measure difference of $C_s$ 202 and $C_g$ 201 at the first phase by sensing at a common terminal 212, where an operational amplifier 220 is employed to regulate the voltage at the common terminal 212. The electrode 211 of $C_s$ 202 and the electrode 210 of $C_g$ 201 are driven by a step drive voltage with the amplitude of $V_D$ 231 and $-V_D$ 232 respectively. The net charge across $C_s$ 202 and $C_g$ 201 transfers to a feedback capacitance $C_f$ 203. The output voltage $V_{OUT}$ 230 which is sampled by the load capacitance $C_{Ls}$ 204 at the end of the first phase operation is given by the equation:

$$V_{OUT\_ph1} = \frac{V_D(C_g - C_s)}{C_f} \quad (11)$$

According to Equation (11), the four phases measurement described in FIG. 2a to FIG. 2d can be reduced into three phases: FIG. 2e for first phase's configuration, FIG. 2c and FIG. 2d for subsequent two phases' configuration respectively. But there are limitations of sensing from the common terminal: in applications where the common terminal 212 is exposed to external environment, it is susceptible to the Electromagnetic Interference (EMI), dust and humidity, etc. The readout accuracy and noise performance will be degraded because of the extra shielding and leakage.

To decrease any chance for a potential charge disturbance at the input during the first two phases which could cause the operational amplifier 220 slewing and limits the speed of the operation, a fixed capacitance which can deliver opposite charges at the first two phases can be added. This feature is described in detail hereinafter with respect to FIG. 3a and FIG. 3b.

Figure 3A:
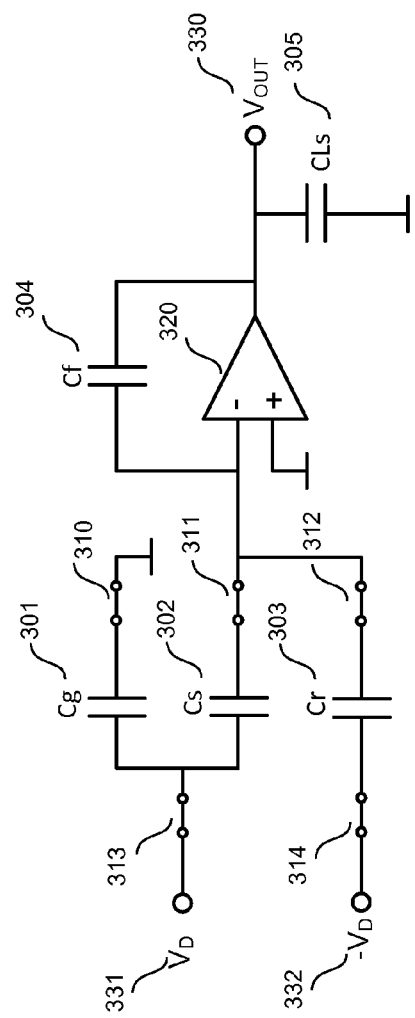
FIG. 3a shows a configuration to measure $C_s$ with a common mode charge cancellation capacitor $C_r$ at the first phase, where both the sense capacitor $C_s$ and a fixed capacitance reference capacitor $C_r$ are connected to a negative input of an operational amplifier.

FIG. 3a shows a configuration to measure $C_s$ 302 a common mode charge cancellation capacitor $C_r$ 303 at a first phase, where both sense capacitor $C_s$ 302 and a fixed capacitance reference capacitor $C_r$ 303 are connected to the negative input of operational amplifier 320. The common terminal of $C_s$ 302 and $C_g$ 301 is driven by a positive step voltage $V_D$ 331, while the $C_r$ 303 is driven by a negative step voltage $-V_D$ 332. Because that $C_s$ 302 and $C_r$ 303 are driven by opposite potential, only net charge across $C_s$ 302 and $C_r$ 303 transfers to a feedback capacitance $C_f$ 304. The output voltage $V_{OUT}$ 330 which is sampled by the load capacitance $C_{Ls}$ 305 at the end of the first phase operation is given by the equation:

$$V_{OUT\_ph1} = \frac{-V_D(C_s - C_r)}{C_f} \quad (12)$$

Figure 3B:
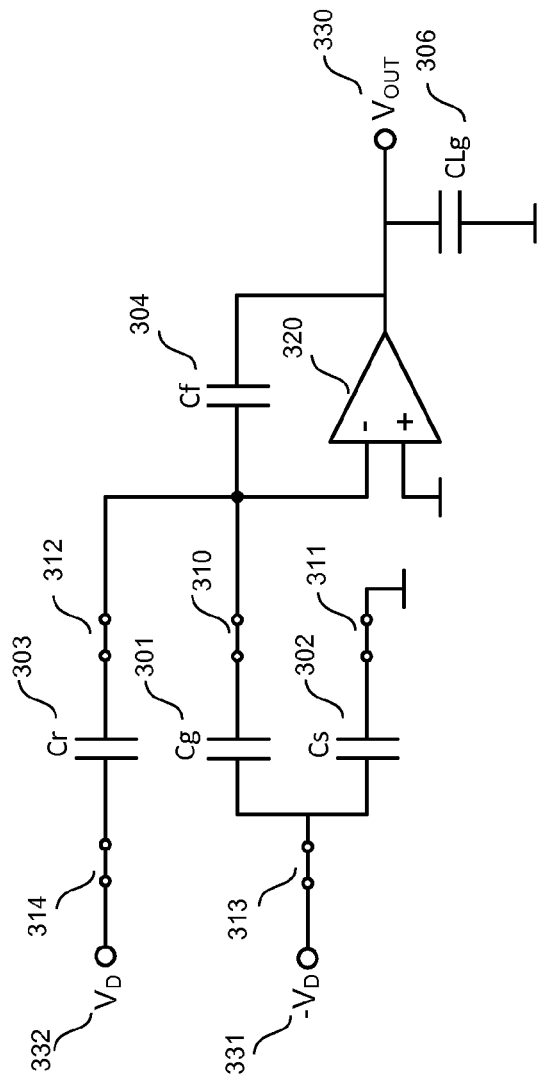
FIG. 3b shows a configuration to measure $C_g$ with a common mode charge cancellation capacitor $C_r$ at the second phase, where both sense the capacitor $C_g$ and a fixed reference capacitor $C_r$ are connected to the negative input of an operational amplifier.

FIG. 3b shows a configuration to measure $C_g$ 301 at a second phase, where both the sense capacitor $C_g$ 301 and $C_r$ 303 are connected to the negative input of operational amplifier 320. The common terminal of $C_s$ 302 and $C_g$ 301 is driven by a negative step voltage $-V_D$ 331, while $C_r$ 303 is driven by a positive step voltage with amplitude of $V_D$ 332. Because $C_g$ 301 and $C_r$ 303 are driven by opposite potential, only the net charge across $C_g$ 301 and $C_r$ 303 transfers to the feedback capacitance $C_f$ 304. The output voltage $V_{OUT}$ 330 which is sampled by the load capacitance $C_{Lg}$ 306 at the end of the first phase operation is given by the equation:

$$V_{OUT\_ph2} = \frac{V_D(C_g - C_r)}{C_f} \quad (13)$$

There is one extra term of $$\frac{V_D C_r}{C_f}$$

in Equation (12) compared to Equation (6) and one extra term of $$\frac{-V_D C_r}{C_f}$$

in equation (13) compared to Equation (7). These two terms have same absolute value with opposite sign. At the following phase as described above, the two terms will be cancelled out and the transfer function is reduced to the one described in Equation (8).

Figure 4A:
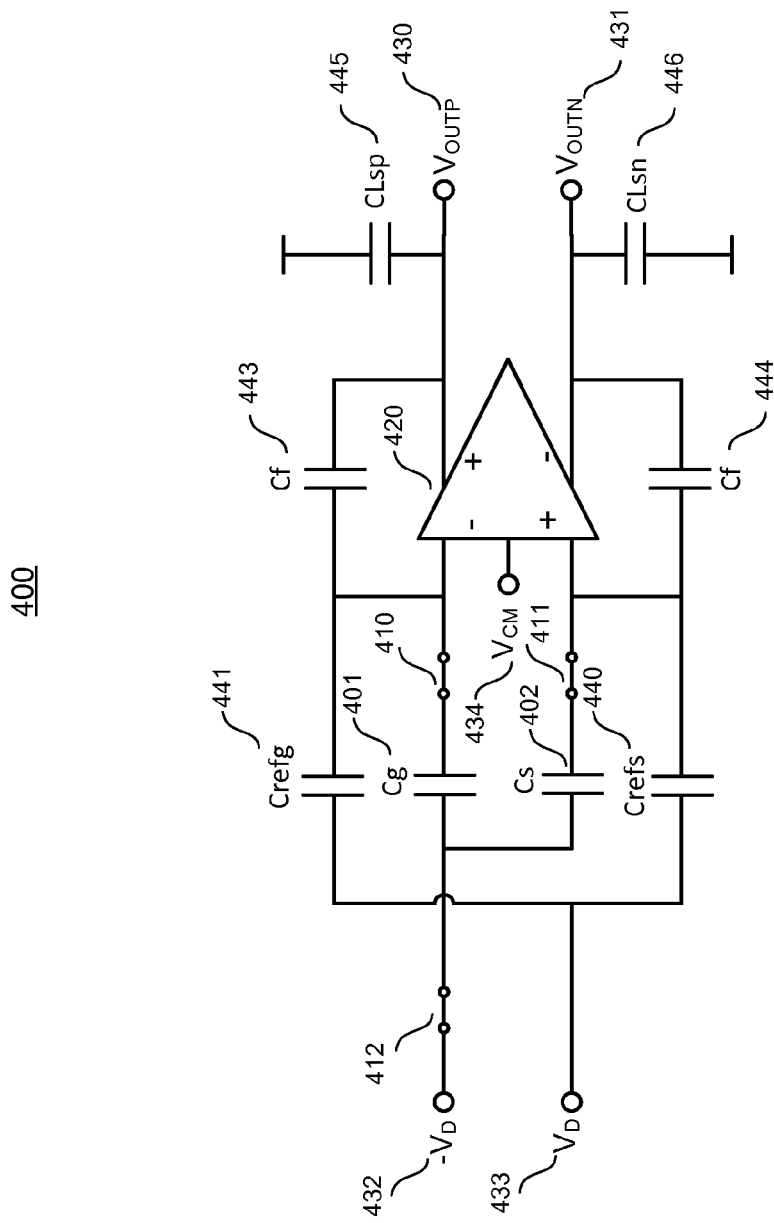
FIG. 4a shows a configuration to measure the difference of $C_s$ and $C_g$ at a first phase, where a differential operational amplifier is employed to regulate the voltage at the sense electrode and a gap electrode.
Figure 4B:
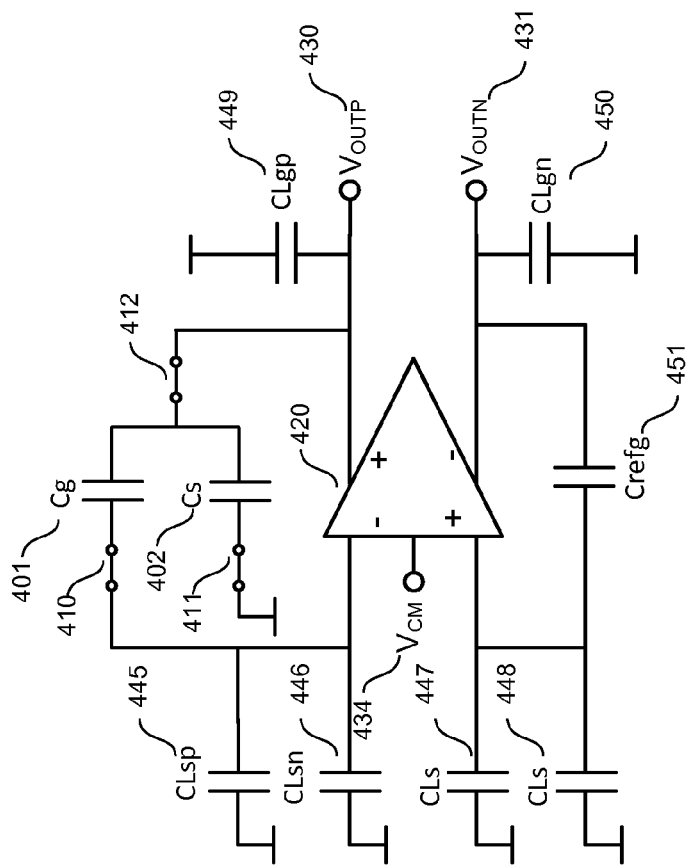
FIG. 4b shows a configuration to linearize the output with respect to $C_g$ at a second phase, where both $C_{Lsp}$ and $C_{Lsn}$ which sampled the first phase outputs are connected to the negative input of the differential operational amplifier.
Figure 4C:
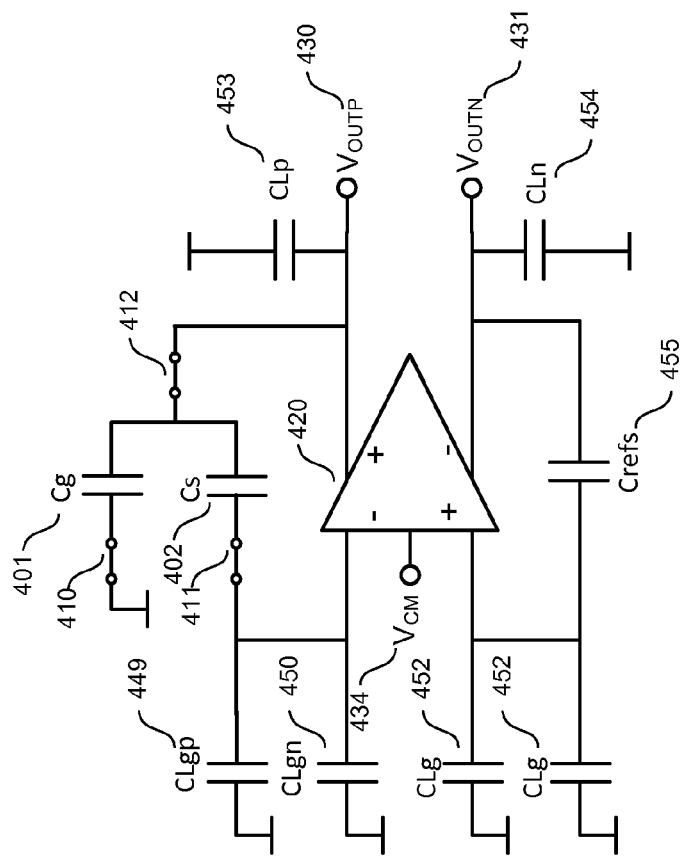
FIG. 4c shows a configuration to linearize the output with respect to $C_s$ at a third phase, where both $C_{Lgp}$ and $C_{Lgn}$ which sampled the second phase outputs are connected to the inputs of the differential operational amplifier.

FIG. 4a to FIG. 4c show the multiple phase operations to linearize the displacement measurement using fully differential structure. This configuration has the advantage of suppression of common mode charge injection, disturbance from supply and disturbance from common mode reference.

FIG. 4a shows a configuration to measure the difference of $C_s$ 402 and $C_g$ 401 at a first phase, where a differential operational amplifier 420 is employed to regulate the voltage at sense electrode 411 and gap electrode 410. A full bridge can be built by employing a pair of reference capacitors $C_{refg}$ 441 and $C_{refs}$ 440. The common terminal 412 of $C_s$ 402 and $C_g$ 401 which is driven by a negative step voltage $V_D$ 432. A positive step voltage $V_D$ 433 drives the shared terminal of reference capacitors $C_{refg}$ 441 and $C_{refs}$ 440. Input common mode feedback is employed to regulate the inputs of differential operational amplifier 420 to common mode reference voltage $V_{CM}$ 434, so that the input nodes of the differential operational amplifier 420 behave as virtual ground. Thus, the net charge delivered from input capacitances $C_g$ 401 and $C_{refg}$ 441 can be transferred through feedback capacitance $C_f$ 443 at a positive path. The net charge delivered from the input capacitances $C_s$ 402 and $C_{refs}$ 440 can be transferred through the feedback capacitance $C_f$ 444 at a negative path. The positive output voltage $V_{OUTP}$ 430 which is sampled by the load capacitance $C_{Lsp}$ 445 at the end of the first phase operation is given by the equation:

$$V_{OUTP\_ph1} = \frac{V_D(C_g - C_{refg})}{C_f} \quad (14)$$

The negative voltage $V_{OUTN}$ 431 which is sampled by the load capacitance $C_{Lsn}$ 446 at the end of the first phase operation is given by the equation:

$$V_{OUTN\_ph1} = \frac{V_D(C_s - C_{refs})}{C_f} \quad (15)$$

FIG. 4b shows a configuration to linearize the output with respect to $C_g$ 401 at a second phase, where both $C_{Lsp}$ 445 and $C_{Lsn}$ 446 which sampled the first phase outputs are connected to the negative input of the differential operational amplifier 420. The positive charge stored at $C_{Lsp}$ 445 and negative charge stored at $C_{Lsn}$ 446 transfers to the feedback capacitance $C_g$ 401. The positive output voltage $V_{OUTP}$ 430 which is sampled by the load capacitance $C_{Lgp}$ 449 at the end of the second phase operation is given by the equation:

$$V_{OUTP\_ph2} = \frac{V_D(C_{Lsp}C_g - C_{Lsn}C_s)}{C_f C_g} \quad (16)$$

$C_{Ls}$ 447, $C_{Ls}$ 448 and $C_{refg}$ 451 form a pseudo negative path to sample the common mode disturbance, common mode noise and charge injections to suppress the circuit introduced non-idealities.

FIG. 4c shows a configuration to linearize the output with respect to $C_s$ 402 at a third phase, where the second phase outputs sampled at $C_{Lgp}$ 449 and $C_{Lgn}$ 450 are connected to the inputs of the differential operational amplifier 420. The charge stored at $C_{Lgp}$ 449 and $C_{Lgn}$ 450 transfers to a feedback capacitance $C_s$ 402. The output voltage $V_{OUTP}$ 430 which is sampled by the load capacitance $C_{Lp}$ 453 at the end of the third phase operation is given by the equation:

$$V_{OUTP\_ph3} = \frac{V_D C_{Lgp}(C_{Lsp}C_g - C_{Lsn}C_s)}{C_f C_g C_s} \quad (17)$$

$C_{Lg}$ 452 and $C_{refs}$ 455 form a pseudo negative path to sample the common mode disturbance, common mode noise and charge injections to cancel the circuit introduced non-idealities.

By setting both $C_{Lsp}$ 445 and $C_{Lsn}$ 446 equal to $C_{Ls}$ the Equation (18) can be reduced to:

$$V_{OUTP\_ph3} = \frac{V_D C_{Lgp} C_{Ls}}{C_f}\left(\frac{1}{C_g} - \frac{1}{C_s}\right) \quad (18)$$

Figure 5A:
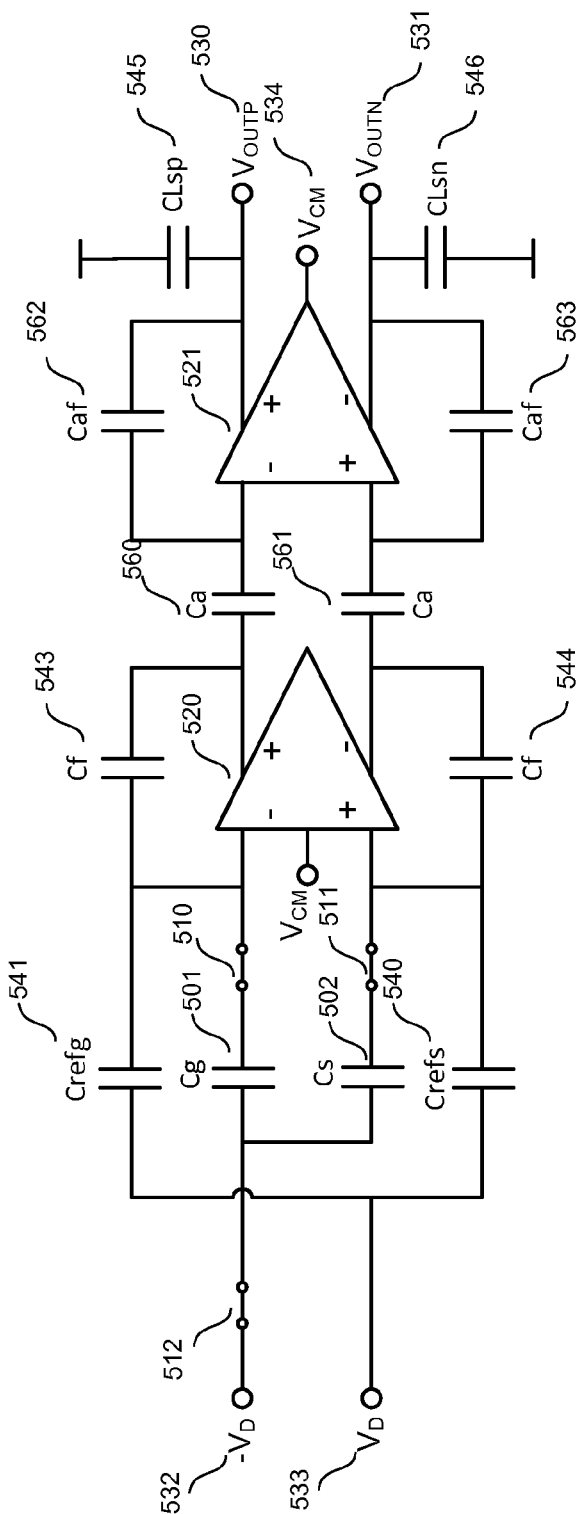
FIG. 5a shows a configuration to measure the difference of $C_s$ and $C_g$ at a first phase, where the second stage of amplifier is employed to attenuate the common mode disturbance.
Figure 5B:
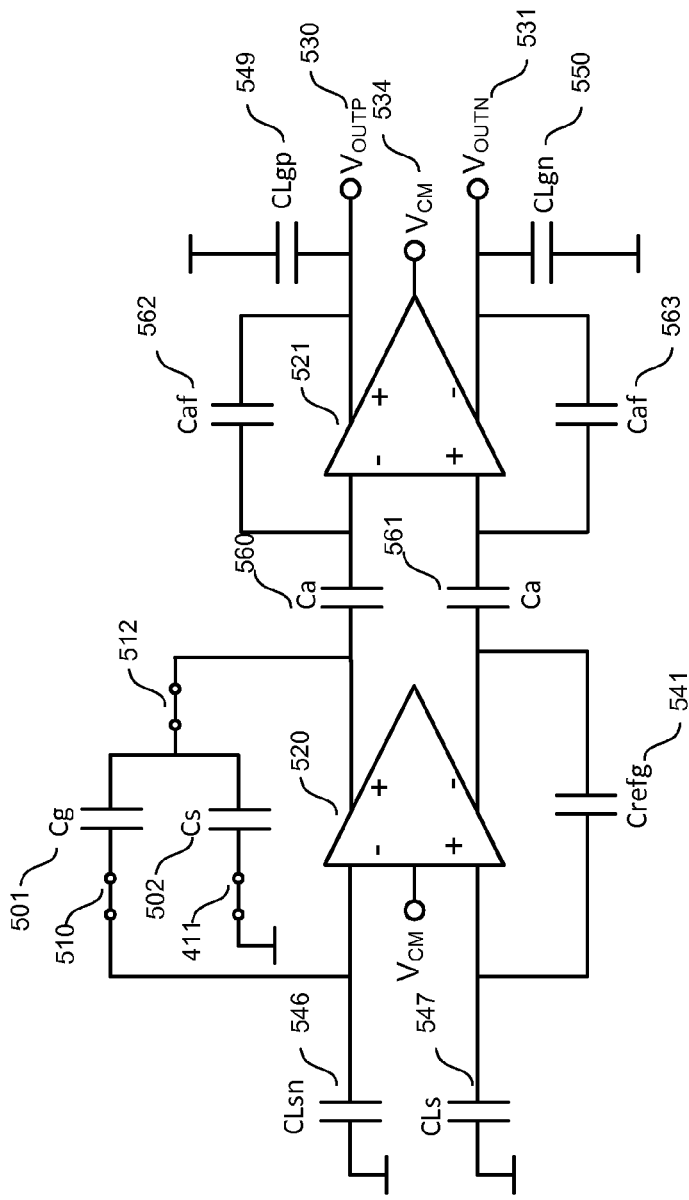
FIG. 5b shows a configuration to linearize the output with respect to $C_g$ at a second phase, where $C_{Lsn}$ which sampled the first phase output is connected to a negative input of the differential operational amplifier.
Figure 5C:
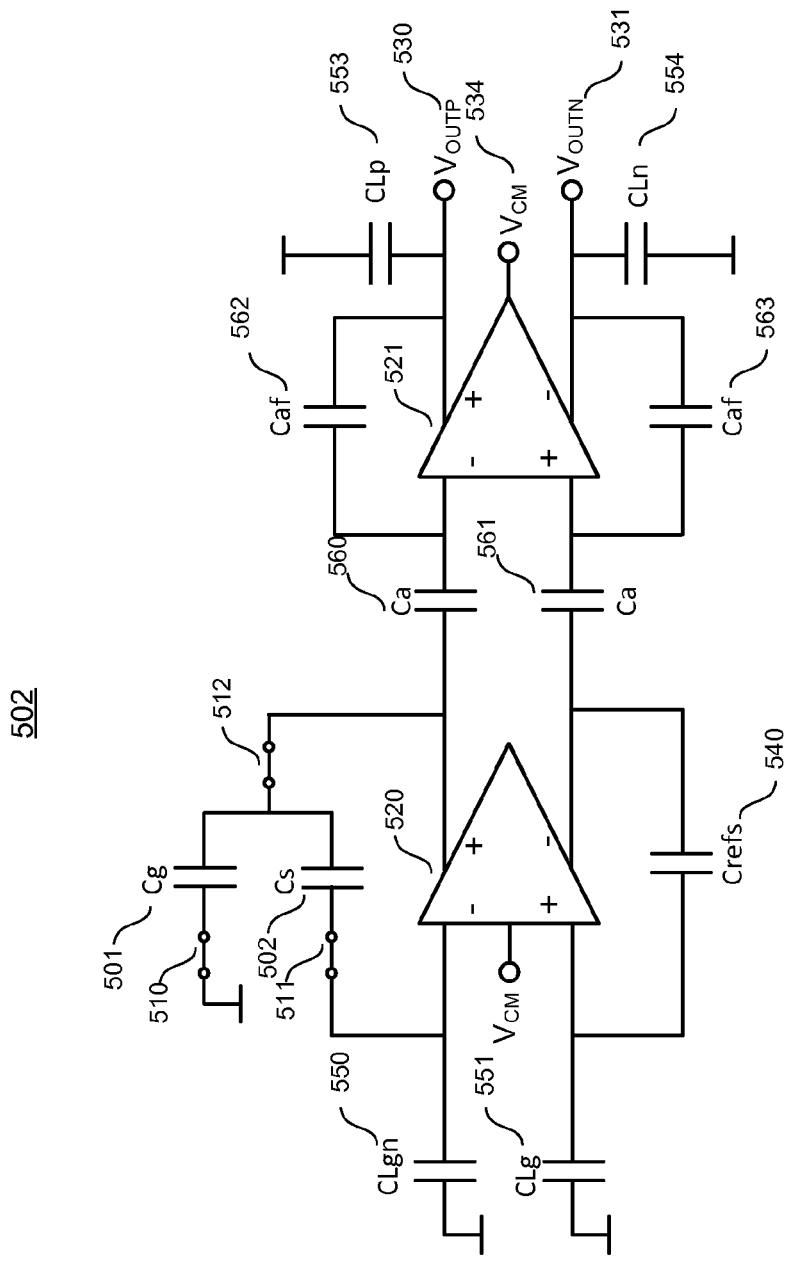
FIG. 5c shows a configuration to linearize the output with respect to $C_s$ at the third phase, where $C_{Lgn}$ which sampled the second phase output is connected to the inputs of the differential operational amplifier.

To suppress the common mode disturbance for the intermediate phases and compute the differential outputs of the operational amplifier 420, a fully differential operational amplifier with output common mode feedback can be employed as described in FIG. 5a to FIG. 5c.

FIG. 5a shows a configuration to measure the difference of $C_s$ 502 and $C_g$ 501 at the first phase, where a differential operational amplifier 520 is employed to regulate the voltage at sense electrode 511 and gap electrode 510. The common terminal 512 of $C_s$ 502 and $C_g$ 501 which is driven by a negative step voltage $V_D$ 532. A positive step voltage $V_D$ 433 drives the shared terminal of reference capacitors $C_{refg}$ 541 and $C_{refs}$ 540. Input common mode feedback is employed to regulate the inputs of differential operational amplifier 520 to common mode reference voltage $V_{CM}$ 534, so that the input nodes of the differential operational amplifier 520 behave as virtual ground.

Thus, the net charge delivered from input capacitances $C_g$ 501 and $C_{refg}$ 541 can be transferred through a feedback capacitance $C_f$ 543 at positive path and sampled by capacitor $C_a$ 560. The net charge delivered from input capacitances $C_s$ 502 and $C_{refs}$ 540 can be transferred through the feedback capacitance $C_f$ 544 at negative path and sampled by capacitor $C_a$ 561. A fully differential operational amplifier 521 with two feedback capacitors $C_{af}$ 562 and 563 computes the voltage difference sampled at capacitors $C_a$ 560 and 561. To attenuate the common mode disturbance at outputs of the differential operational amplifier 520, an output common mode feedback is employed at the differential operational amplifier 521 so that the common mode of $V_{OUTP}$ and $V_{OUTN}$ is regulated to common mode voltage $V_{CM}$ 534. The positive output voltage $V_{OUTP}$ 530 which is sampled by the load capacitance $C_{Lsp}$ 545 at the end of the first phase operation is given by the equation:

$$V_{OUTP\_ph1} = V_{CM} + \frac{V_D C_a(C_g - C_s)}{2C_{af}C_f} \quad (19)$$

The negative voltage $V_{OUTN}$ 531 which is sampled by the load capacitance $C_{Lsn}$ at the end of the first phase operation is given by the equation:

$$V_{OUTN\_ph1} = V_{CM} - \frac{V_D C_a(C_g - C_s)}{2C_{af}C_f} \quad (20)$$

FIG. 5b shows a configuration to linearize the output with respect to $C_g$ 501 at a second phase, where $C_{Lsn}$ 546 which sampled the first phase output is connected to the negative input of the differential operational amplifier 520. The charge stored at $C_{Lsn}$ 546 transfers to the feedback capacitances $C_g$ 501. $C_{Ls}$ 547 and $C_{refg}$ 551 to form a pseudo negative path to sample the common mode disturbance, common mode noise and charge injections to cancel the circuit introduced non-idealities. $C_a$ 560 and 561 sample the outputs of differential operational amplifier 520. The positive output voltage $V_{OUTP}$ 530 which is sampled by the load capacitance $C_{Lgp}$ 549 at the end of the second phase operation is given by the equation:

$$V_{OUTP\_ph2} = V_{CM} + \frac{V_D C_{Lsn} C_a C_a (C_g - C_s)}{4C_{af}C_{af}C_f C_g} \quad (21)$$

The negative voltage $V_{OUTN}$ 531 which is sampled by the load capacitance $C_{Lgn}$ 550 at the end of the second phase operation is given by the equation:

$$V_{OUTN\_ph2} = V_{CM} - \frac{V_D C_{Lsn} C_a C_a (C_g - C_s)}{4C_{af}C_{af}C_f C_g} \quad (22)$$

FIG. 5c shows a configuration to linearize the output with respect to $C_s$ 502 at the third phase, where the second phase output sampled at $C_{Lgn}$ 550 is connected to the inputs of the differential operational amplifier 520. The charge stored at $C_{Lgn}$ 550 transfers to a feedback capacitance $C_s$ 502. $C_{Lg}$ 551 and $C_{refs}$ 540 form a pseudo negative path to sample the common mode disturbance, common mode noise and charge injections to cancel the circuit introduced non-idealities The output voltage $V_{OUTP}$ 530 which is sampled by the load capacitance $C_{Lp}$ 553 at the end of the third phase operation is given by:

$$V_{OUTP\_ph3} = V_{CM} + \frac{V_D C_{Lsn} C_{Lgn} C_a C_a C_a (C_g - C_s)}{8C_{af}C_{af}C_{af}C_f C_g} \quad (23)$$

The negative voltage $V_{OUTN}$ 531 which is sampled by the load capacitance $C_{Ln}$ 554 at the end of the third phase operation is given by:

$$V_{OUTN\_ph3} = V_{CM} - \frac{V_D C_{Lsn} C_{Lgn} C_a C_a C_a (C_g - C_s)}{8C_{af}C_{af}C_{af}C_f C_g} \quad (24)$$

The differential output is difference between $V_{OUTP\_ph3}$ and $V_{OUTN\_ph3}$.

$$V_{OUTP\_diff} = \frac{V_D C_{Lsn} C_{Lgn} C_a C_a C_a (C_g - C_s)}{4 C_{af} C_{af} C_{af} C_f C_g} \quad (25)$$

By setting both $C_{Lsp}$ 445 and $C_{Lsn}$ 446 equal to $C_{Ls}$, $C_a$ 560 and 561 are equal to two times of the feedback capacitor $C_{af}$ 562 and 563, therefore Equation 25 is reduced to $$V_{OUTP\_diff} = \frac{2 V_D C_{Lgp} C_{Ls}}{C_f} \left( \frac{1}{C_g} - \frac{1}{C_s} \right) \quad (26)$$

Figure 6:
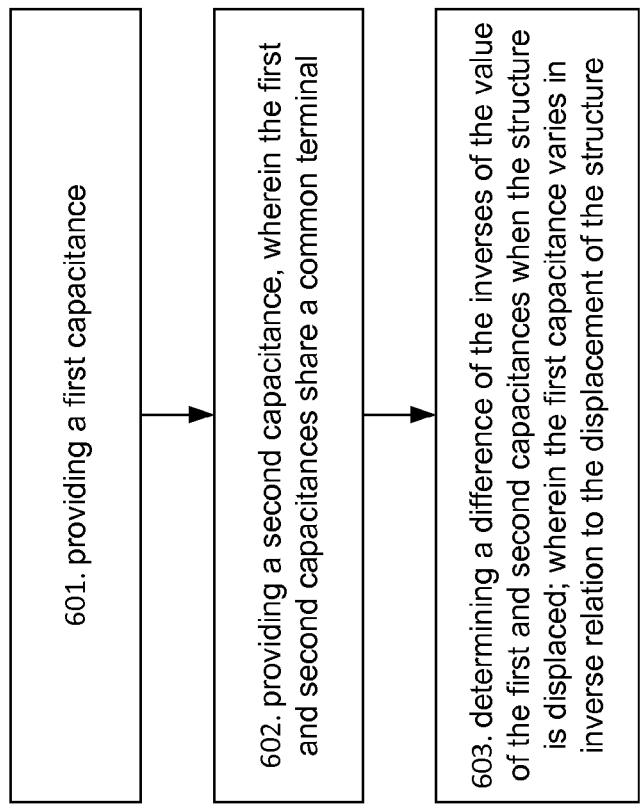
FIG. 6 shows a flow chart of method of linearization of capacitive displacement sensor in accordance with an embodiment.

The method of the measuring displacement of a sensor structure which provides two capacitors is summarized in FIG. 6. The two capacitors in the structure share a common terminal and the displacement of one of or both of the capacitors is changing accordingly with applied force. The first step 601 is to provide the first capacitance. The second step 602 is to provide the second capacitance. The difference of the inverse of the result generated in 601 and the inverse of the result generated in 602 can be determined in the third step 603. The output of the step 603 is proportional to the difference of displacements of the two capacitors.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A method for measuring displacement of a structure, comprising:
   providing a first capacitance;
   providing a second capacitance, wherein the first and second capacitances share a common terminal; wherein the second capacitance is a rigid capacitance attached between the common terminal and the structure; and
   determining a difference of the inverses of the value of the first and second capacitances when the structure is displaced; wherein only the first capacitance varies in inverse relation to the displacement of the structure.

2. The method of claim 1 wherein the determining step is performed in at least two phases wherein the first phase produces a first output voltage corresponding to a difference of the first and second capacitances; wherein the first output voltage is stored in a sampling capacitance; and the second phase produces a second output voltage that is proportional to the stored first output voltage multiplied by the ratio of a sampling capacitance to the first capacitance.

3. The method of claim 1, wherein the determining step is performed in three phases; wherein in the first phase, an output voltage is proportional to a difference between the values of the first and second capacitances; wherein the first output voltage is stored in a first sampling capacitance;
   in a second phase, the second phase produces a second output voltage that is proportional to the stored first voltage multiplied by the ratio of a sampling capacitance to the first capacitance; wherein the second output voltage is stored in a second sampling capacitance;
   the third phase produces a third output voltage that is proportional to the stored second voltage multiplied by the ratio of the second sampling capacitance to the second capacitance.

4. The method of claim 1, wherein the determining step is performed in four phases; wherein in a first phase, an output voltage is proportional to a difference between the values of the first and second capacitances; wherein the first output voltage is stored in a first sampling capacitance;
   in a second phase, the second phase produces a second output voltage that is proportional to the stored first voltage multiplied by the ratio of the first sampling capacitance to the first capacitance; wherein the second output voltage is stored in a second sampling capacitance;
   in a third phase, the third phase produces a third output voltage that is proportional to the stored second voltage multiplied by the ratio of a second sampling capacitance to the second capacitance; wherein the third output voltage is stored in a third sampling capacitor; and
   in a fourth phase, the fourth phase produces a fourth output voltage that is proportional to the stored third voltage multiplied by the ratio of the third sampling capacitance to the first capacitance.

5. The method of claim 1 wherein the structure comprises a displacement sensor.

6. The method of claim 1 wherein the displacement varies in proportion to an applied pressure.

7. A displacement sensor, comprising:
   a first capacitor;
   a second capacitor; wherein the second capacitor is a rigid capacitance attached between the common terminal and the structure; wherein the first and second capacitors share a common terminal; wherein a value of the first capacitor varies in relation to a displacement; and
   an amplifier coupled to the first and second capacitors; wherein the amplifier determines a difference of the inverses of the value of the first and second capacitances when the structure is displaced; wherein only the first capacitance varies in inverse relation to the displacement of the structure.

8. The displacement sensor of claim 7, wherein the determination is performed in at least two phases wherein the first phase produces a first output voltage corresponding to a difference of the first and second capacitors; wherein the first output voltage is stored in a sampling capacitance; and the second phase produces a second output voltage that is proportional to the stored first output voltage multiplied by the ratio of the sampling capacitance to the first capacitor.

9. The displacement sensor of claim 7, wherein the determination is performed in three phases; wherein in the first phase, an output voltage is proportional to a difference between the values of the first and second capacitors; wherein the first output voltage is stored in a first sampling capacitance;
   in a second phase, the second phase produces a second output voltage that is proportional to the stored first voltage multiplied by the ratio of the first sampling capacitance to the first capacitor; wherein the second output voltage is stored in a second sampling capacitance; and
   in a third phase, the third phase produces a third output voltage that is proportional to the stored second voltage multiplied by the ratio of a second sampling capacitance to the second capacitor.

10. The displacement sensor of claim 7, wherein the determination step is performed in four phases; wherein in a first phase, an output voltage is proportional to a difference between the values of the first and second capacitors; wherein the first output voltage is stored in a first sampling capacitance;
- in a second phase, the second phase produces a second output voltage that is proportional to the stored first voltage multiplied by the ratio of the first sampling capacitance to the first capacitor; wherein the second output voltage is stored in a second sampling capacitance;
- in a the third phase produces a third output voltage that is proportional to the stored second voltage multiplied by the ratio of a second sampling capacitance to the second capacitor; wherein the third output voltage is stored in a third sampling capacitor; and
- in a fourth phase; the fourth phase produces a fourth output voltage that is proportional to the stored third voltage multiplied by the ratio of the third sampling capacitance to the first capacitor.

11. The displacement sensor of claim 7, wherein the amplifier comprises a differential amplifier.

\* \* \* \* \*